(12) United States Patent
Nakamura

(10) Patent No.: US 10,484,574 B2
(45) Date of Patent: Nov. 19, 2019

(54) PRINTING APPARATUS PERFORMING PROCESS CORRESPONDING TO USER, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Tadahiro Nakamura, Kashiwa (JP)

(73) Assignee: CANON KABUSIKI KAISHA, Tokyo (JP)

( * ) Notice: Subject to any disclaimer, the term of this patent is extended or adjusted under 35 U.S.C. 154(b) by 0 days.

(21) Appl. No.: 16/238,843

(22) Filed: Jan. 3, 2019

(65) Prior Publication Data

US 2019/0141215 A1 May 9, 2019

Related U.S. Application Data

(63) Continuation of application No. 15/645,255, filed on Jul. 10, 2017, now Pat. No. 10,212,311.

(30) Foreign Application Priority Data

Jul. 28, 2016 (JP) .................................. 2016-148522

(51) Int. Cl.
*H04N 1/44* (2006.01)
*G06F 3/12* (2006.01)
*H04N 1/00* (2006.01)

(52) U.S. Cl.
CPC ......... *H04N 1/4413* (2013.01); *G06F 3/1236* (2013.01); *G06F 3/1238* (2013.01);
(Continued)

(58) Field of Classification Search
USPC ....................................................... 358/1.15
See application file for complete search history.

(56) References Cited

U.S. PATENT DOCUMENTS

2009/0257078 A1* 10/2009 Sawada ................. G06F 21/608
358/1.14
2009/0310178 A1* 12/2009 Tomita .................. G06F 21/608
358/1.15
(Continued)

FOREIGN PATENT DOCUMENTS

JP        2011000768 A      1/2011

OTHER PUBLICATIONS

Office Action issued in U.S. Appl. No. 15/645,255 dated Nov. 28, 2017.
(Continued)

*Primary Examiner* — Neil R McLean
(74) *Attorney, Agent, or Firm* — Rossi, Kimms & McDowell LLP

(57) ABSTRACT

A printing apparatus that is capable of performing a process corresponding to a user certainly. A management unit manages relating information that relates an information processing apparatus sending print data with a user who is permitted to use the printing apparatus. A specifying unit specifies a user who instructed execution of printing of the print data to the information processing apparatus based on the relating information. A processing unit executes a process corresponding to the user specified.

20 Claims, 15 Drawing Sheets

(52) U.S. Cl.
CPC .......... *G06F 3/1239* (2013.01); *G06F 3/1268* (2013.01); *G06F 3/1285* (2013.01); *G06F 3/1292* (2013.01); *H04N 1/00411* (2013.01); *H04N 1/4433* (2013.01); *H04N 2201/0094* (2013.01)

(56) References Cited

U.S. PATENT DOCUMENTS

| | | | | |
|---|---|---|---|---|
| 2012/0120451 A1* | 5/2012 | Ikegami | ................ | G06F 21/608 358/1.15 |
| 2014/0313539 A1* | 10/2014 | Kawano | .................. | G06F 21/44 358/1.14 |
| 2016/0070509 A1* | 3/2016 | Takahira | ............... | G06F 3/1204 358/1.15 |

OTHER PUBLICATIONS

Office Action issued in U.S. Appl. No. 15/645,255 dated Jun. 29, 2018.
Notice of Allowance issued in U.S. Appl. No. 15/645,255 dated Oct. 16, 2018.

\* cited by examiner

FIG. 5A

| USER NAME | PASSWORD |
|---|---|
| user1 | pass1 |
| user2 | pass2 |
| user3 | pass3 |

| USER NAME | COLOR PRINTING | MONOCHROME PRINTING |
|---|---|---|
| user1 | PERMITTED | PERMITTED |
| user2 | NOT PERMITTED | PERMITTED |
| user3 | NOT PERMITTED | PERMITTED |

| USER NAME | SHEET COUNT OF COLOR PRINTING | SHEET COUNT OF MONOCHROME PRINTING |
|---|---|---|
| user1 | 100 | 50 |
| user2 | 0 | 30 |
| user3 | 0 | 20 |

503

| TERMINAL IDENTIFICATION INFORMATION | USER NAME |
|---|---|
| ABCD1234 | user1 |
| XYZW5678 | user2 |
| OPQR1111 | user1 |

FIG. 13A

REGISTER TERMINAL IDENTIFICATION INFORMATION — 1300

| TERMINAL IDENTIFICATION INFORMATION | USER NAME |
| --- | --- |
| ABCD1234 | user1 |
| XYZW5678 | user2 |
| OPQR1111 | user1 |
|  |  |

[ ADD ] [ EDIT ] [ DELETE ] [ OK ]

TERMINAL IDENTIFICATION INFORMATION

[_____] ~1303

USER NAME

[_____▽] ~1304

[ OK ] [ Cancel ]

PRINTING APPARATUS PERFORMING PROCESS CORRESPONDING TO USER, CONTROL METHOD THEREFOR, AND STORAGE MEDIUM STORING CONTROL PROGRAM THEREFOR

BACKGROUND OF THE INVENTION

Field of the Invention

The present invention relates to a printing apparatus performing a process corresponding to a user, a control method therefor, and a storage medium storing control program therefor.

Description of the Related Art

There is a known MFP as a printing apparatus that obtains print data from information processing apparatuses, such as a smart phone, a tablet terminal, and a PC (personal computer), and prints according to the print data concerned. The print data includes print setting information for printing and user specification information for specifying a user who instructed printing. An MFP manages setting information about the MFP, using history information about the MFP, etc. for each user who is permitted to use the MFP concerned, and performs a process corresponding to a user on the basis of the user specification information included in print data (for example, see Japanese Laid-Open Patent Publication (Kokai) No. 2011-768 (JP 2011-768A)). For example, the MFP determines whether use of color printing is permitted on the basis of the obtained user specification information, and counts the number of printed sheets for each user. Moreover, the MFP may perform a retention printing process in which the MFP does not print immediately print data received from an information processing apparatus, but will start printing when a user logs in to the MFP. In such a retention printing process, the MFP displays only the information about the print data instructed by the login user among retained print data on an operation unit etc.

However, there are cases where a conventional MFP cannot perform a process corresponding to a user. For example, when print data is generated by an information processing apparatus like a PC in which a user name for login is set beforehand, the information processing apparatus sets the user name for login to the print data as the user specification information. When receiving the print data from such an information processing apparatus, an MFP is able to specify the user who instructed printing on the basis of the user name for login included in the print data. On the other hand, when print data is generated by an information processing apparatus, such as a smart phone and a portable terminal called a tablet terminal, in which a user name for login is not set beforehand, the information processing apparatus cannot set the user specification information to the print data. Accordingly, when receiving the print data from such an information processing apparatus, the MFP cannot specify a user who instructed printing on the basis of the information included in the print data only. As a result, a process corresponding to the user cannot be performed.

SUMMARY OF THE INVENTION

The present invention provides a printing apparatus, a control method thereof, and a storage medium storing a control program therefor, which are capable of performing a process corresponding to a user certainly.

Accordingly, a first aspect of the present invention provides a printing apparatus including a management unit configured to manage relating information that relates an information processing apparatus sending print data with a user who is permitted to use the printing apparatus, a specifying unit configured to specify a user who instructed execution of printing of the print data to the information processing apparatus based on the relating information, and a processing unit configured to execute a process corresponding to the user specified.

Accordingly, a second aspect of the present invention provides a control method for a printing apparatus, the control method including a management step of managing relating information that relates an information processing apparatus sending the printing apparatus print data with a user who is permitted to use the printing apparatus, a specifying step of specifying a user who instructed execution of printing of the print data to the information processing apparatus based on the relating information, and a processing step of executing a process corresponding to the user specified.

Accordingly, a third aspect of the present invention provides a non-transitory computer-readable storage medium storing a control program causing a computer to execute the control method of the second aspect.

According to the present invention, a process corresponding to a user can be performed certainly.

Further features of the present invention will become apparent from the following description of exemplary embodiments with reference to the attached drawings.

BRIEF DESCRIPTION OF THE DRAWINGS

FIG. 5A, FIG. 5B, and FIG. 5C are views showing examples of databases managed by the MFP shown in FIG. 1.

FIG. 13A and FIG. 13B are views showing examples of setting screens displayed on the operation-display unit shown in FIG. 2.

DESCRIPTION OF THE EMBODIMENTS

Hereafter, embodiments according to the present invention will be described in detail with reference to the drawings.

Although the embodiment describes a case where the present invention is applied to an MFP as a printing apparatus, application destinations of the present invention are not limited to an MFP. The present invention is applicable to a printing apparatus as long as the printing apparatus can receive print data from an external apparatus.

Figure 1:
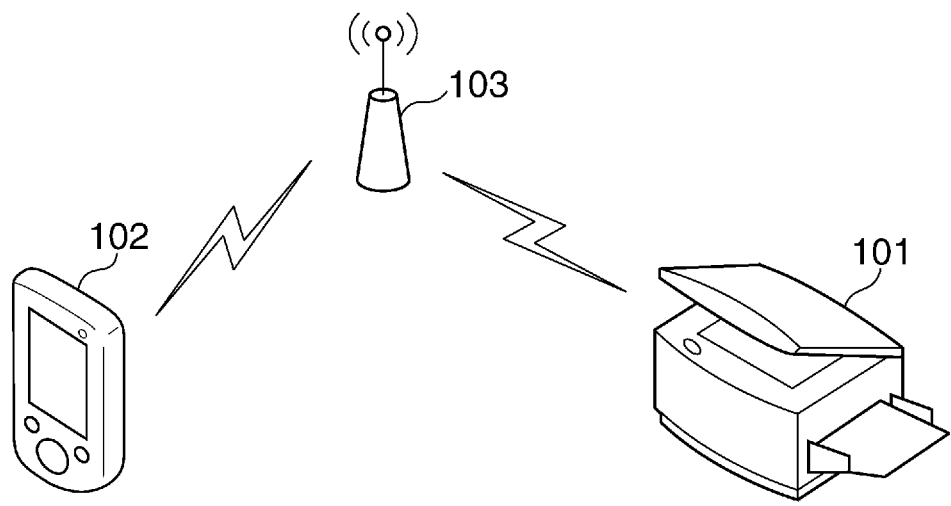
FIG. 1 is a block diagram schematically showing a configuration of a communication system including an MFP as a printing apparatus according to an embodiment of the present invention.

FIG. 1 is a block diagram schematically showing a configuration of a communication system 100 including an MFP 101 as a printing apparatus according to the embodiment of the present invention.

As shown in FIG. 1, the communication system 100 is provided with the MFP 101 and a portable terminal 102 as an information processing apparatus. The MFP 101 and the portable terminal 102 are communicable through an access point 103.

The MFP 101 receives print data from the portable terminal 102, and prints on the basis of the print data. The portable terminal 102 generates print data 1000 shown in FIG. 10A mentioned later including print setting information, image data, etc. for printing, and sends the print data 1000 concerned to the MFP 101. Since the portable terminal 102 is not shared by a plurality of users but only one user uses usually, a user name for logging in to the portable terminal 102 concerned is not set to the portable terminal 102 in many cases. It is premised that the above-mentioned user name for login etc. is not set to the portable terminal 102 in the embodiment.

Figure 2:
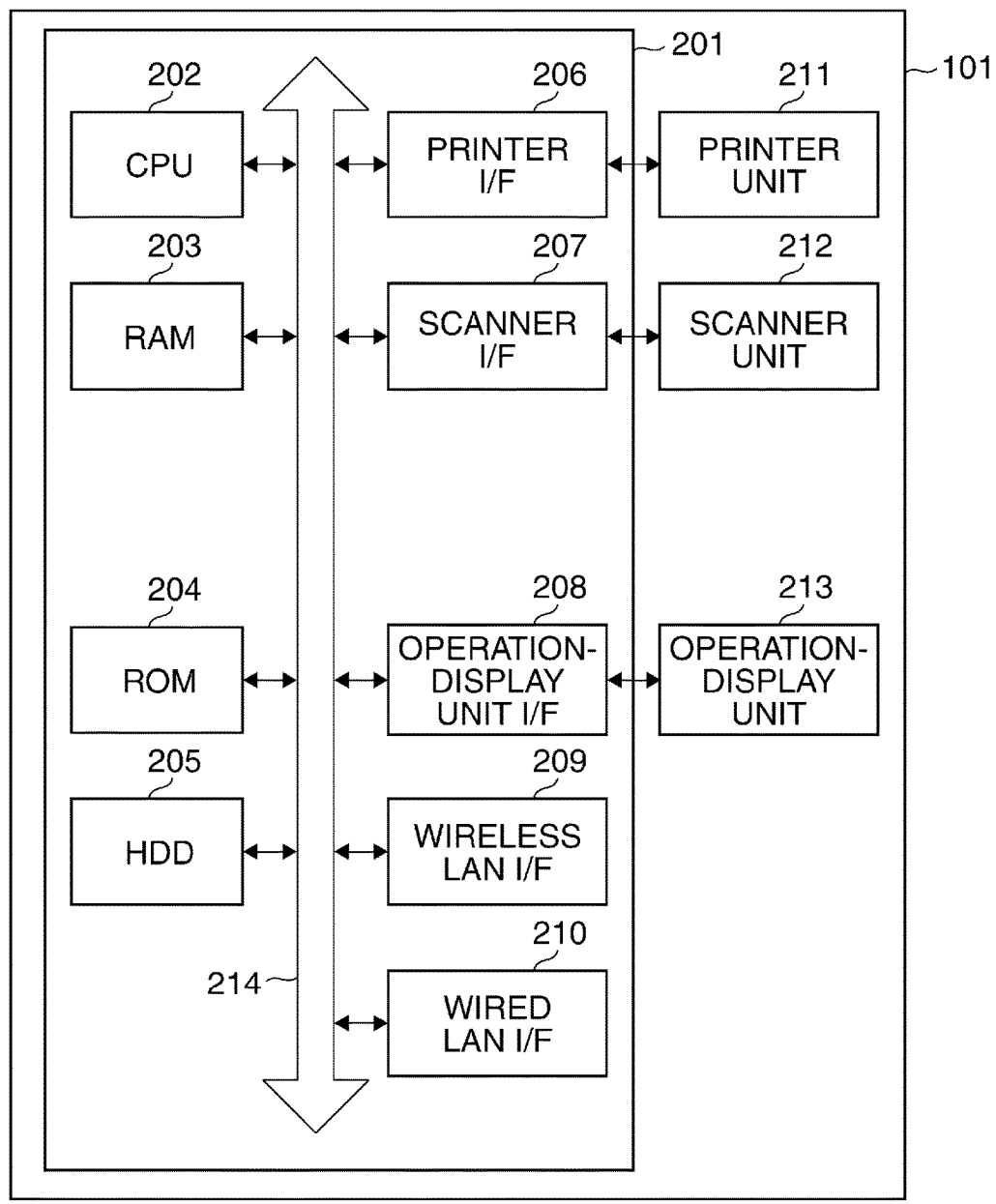
FIG. 2 is a block diagram schematically showing a hardware configuration of the MFP shown in FIG. 1.

FIG. 2 is a block diagram schematically showing a hardware configuration of the MFP 101 shown in FIG. 1.

As shown in FIG. 2, the MFP 101 is provided with a control unit 201, a printer unit 211, a scanner unit 212, and an operation-display unit 213. The control unit 201 is connected with the printer unit 211, the scanner unit 212, and the operation-display unit 213, respectively. The control unit 201 is provided with a CPU 202, a RAM 203, a ROM 204, an HDD 205, a printer I/F 206, a scanner I/F 207, an operation-display unit I/F 208, a wireless LAN I/F 209, and a wired LAN I/F 210. The CPU 202, RAM 203, ROM 204, HDD 205, printer I/F 206, scanner I/F 207, operation-display unit I/F 208, wireless LAN I/F 209, and wired LAN I/F 210 are mutually connected through a system bus 214.

The control unit 201 totally controls the entire MFP 101. The CPU 202 performs each process of a software module 400 in FIG. 4 mentions later by running a program stored in the ROM 204. The RAM 203 is used as a working area of the CPU 202, and the RAM 203 is used as a temporary storage area of data. The ROM 204 stores data and programs that are performed by the CPU 202. The HDD 205 stores programs, setting information, etc. The printer I/F 206 performs a data communication with the printer unit 211. The scanner I/F 207 performs a data communication with the scanner unit 212. The operation-display unit I/F 208 performs a data communication with the operation-display unit 213. The wireless LAN I/F 209 performs a wireless LAN communication with the portable terminal 102 etc. through the access point 103. For example, the wireless LAN I/F 209 receives print data from the portable terminal 102 through the access point 103. The wired LAN I/F 210 communicates with an external apparatus that is connected through a LAN cable (not shown).

The printer unit 211 prints image data received from the portable terminal 102, image data generated by the scanner unit 212, or the like onto a paper sheet. The scanner unit 212 reads an original arranged on an original platen (not shown), and generates image data. The operation-display unit 213 is provided with a liquid crystal display unit that has a touch panel function, a keyboard, function keys, etc. that are not shown. The operation-display unit 213 displays a menu screen through which a user inputs information.

Figure 3A:
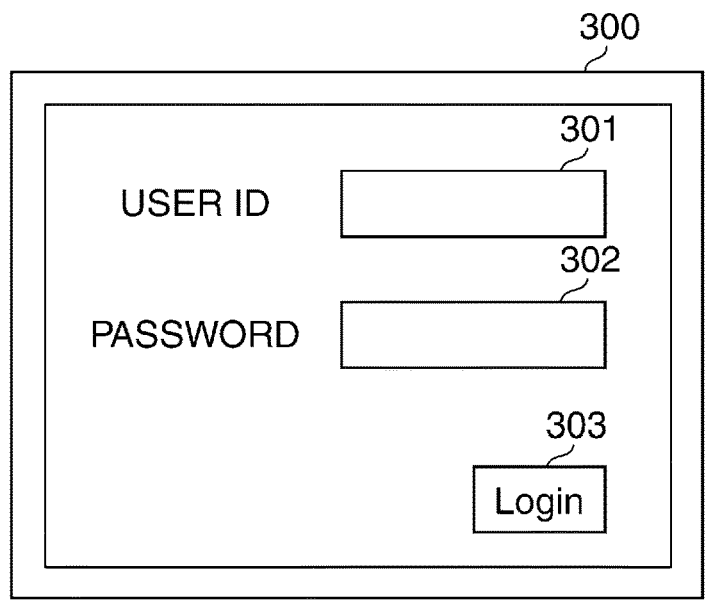
FIG. 3A and FIG. 3B are views showing examples of setting screens displayed on an operation-display unit shown in FIG. 1.
Figure 3B:
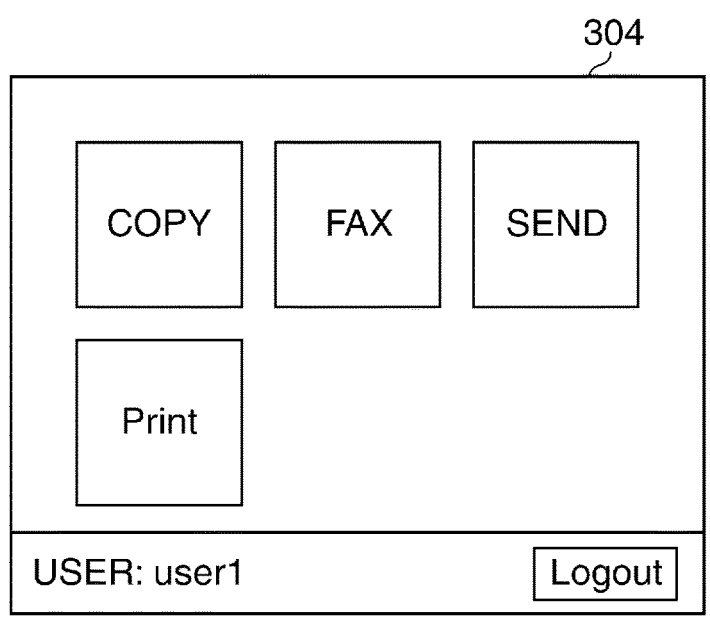

For example, the operation-display unit 213 displays a login information setting screen 300 shown in FIG. 3A through which the user logs in to the MFP 101. The login information setting screen 300 is provided with input columns 301 and 302 into which a user ID and a password are respectively input and a login button 303 that is used to instruct execution of an authentication process for the pieces of information input into the input columns 301 and 302 concerned. When the authentication process for the pieces of information input into the input columns 301 and 302 succeeds, the operation-display unit 213 displays a job setting screen 304 shown in FIG. 3B that is used to instruct execution of each job to the MFP 101. The user sets up each item in the job setting screen 304 and instructs execution of a job to the MFP 101. Although a method using the login information setting screen 300 is described as a login method for the MFP 101 in the embodiment, the login method for the MFP 101 is not limited to this method. For example, when the MFP 101 has an IC card reader (not shown), user information may be obtained from an IC card held up to the IC card reader, and the login process of the MFP 101 may be performed on the basis of the user information.

Figure 4:
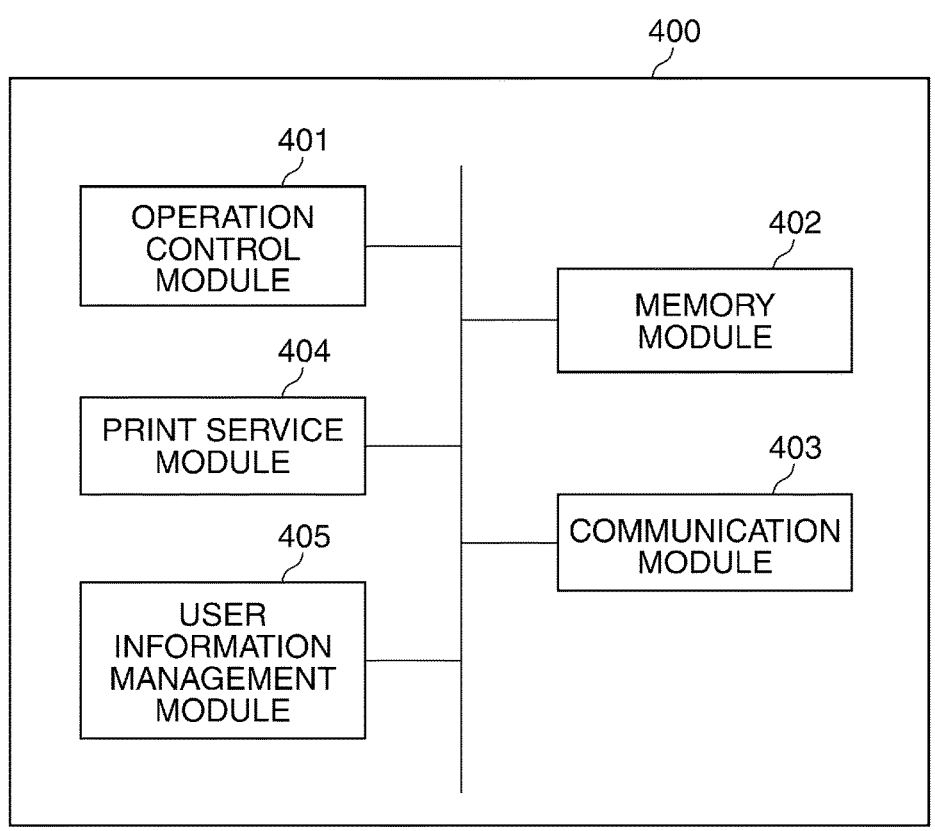
FIG. 4 is a block diagram schematically showing a configuration of a software module of the MFP shown in FIG. 1.

FIG. 4 is a block diagram schematically showing a configuration of the software module 400 of the MFP 101 shown in FIG. 1.

As shown in FIG. 4, the software module 400 is provided with an operation control module 401, a memory module 402, a communication module 403, a print service module 404, and a user information management module 405. Each process of the software module 400 is performed when the CPU 202 runs the program stored in the ROM 204 or the HDD 205.

The operation control module 401 controls the display on the operation-display unit 213. Moreover, the operation control module 401 receives information that was input by a user's operation to the operation-display unit 213. The memory module 402 makes the ROM 204 and the HDD 205 store data. Moreover, the memory module 402 reads data stored in the ROM 204 and the HDD 205. The communication module 403 controls communications by the wireless LAN I/F 209 and the wired LAN I/F 210.

When receiving print data from the portable terminal 102 etc., the print service module 404 determines whether a protocol format of the print data concerned is acceptable to the printer unit 211. The acceptable protocol format is an IPP (Internet Printing Protocol) or an LPR (Line PRinter daemon protocol), for example. When the protocol format of the received print data is acceptable, the print service module 404 outputs the print data concerned to the print-data printer unit 211.

The user information management module 405 manages databases, such as an authentication-management DB 501 shown in FIG. 5A, an authority management DB 502 shown in FIG. 5B, and a printed-sheet-count-management DB 503 shown in FIG. 5C, that are used for a process corresponding to a user. The authentication-management DB 501 is a database that manages a user name and password of a user who is permitted to use the MFP 101. The authentication-management DB 501 is used for the authentication process for the user name and password that are input into the respective input columns 301 and 302 in the login information setting screen 300 of the MFP 101, for example. The authority management DB 502 is a database that manages use permission information about each function of the MFP 101. Information showing whether executions of color printing and monochrome printing are permitted is set in the authentication-management DB 501 as a use permission information, for example. The printed-sheet-count-management DB 503 is a database that manages the printed sheet count of color printing and the printed sheet count of monochrome printing for each user name managed by the authentication-management DB 501.

Figure 6:
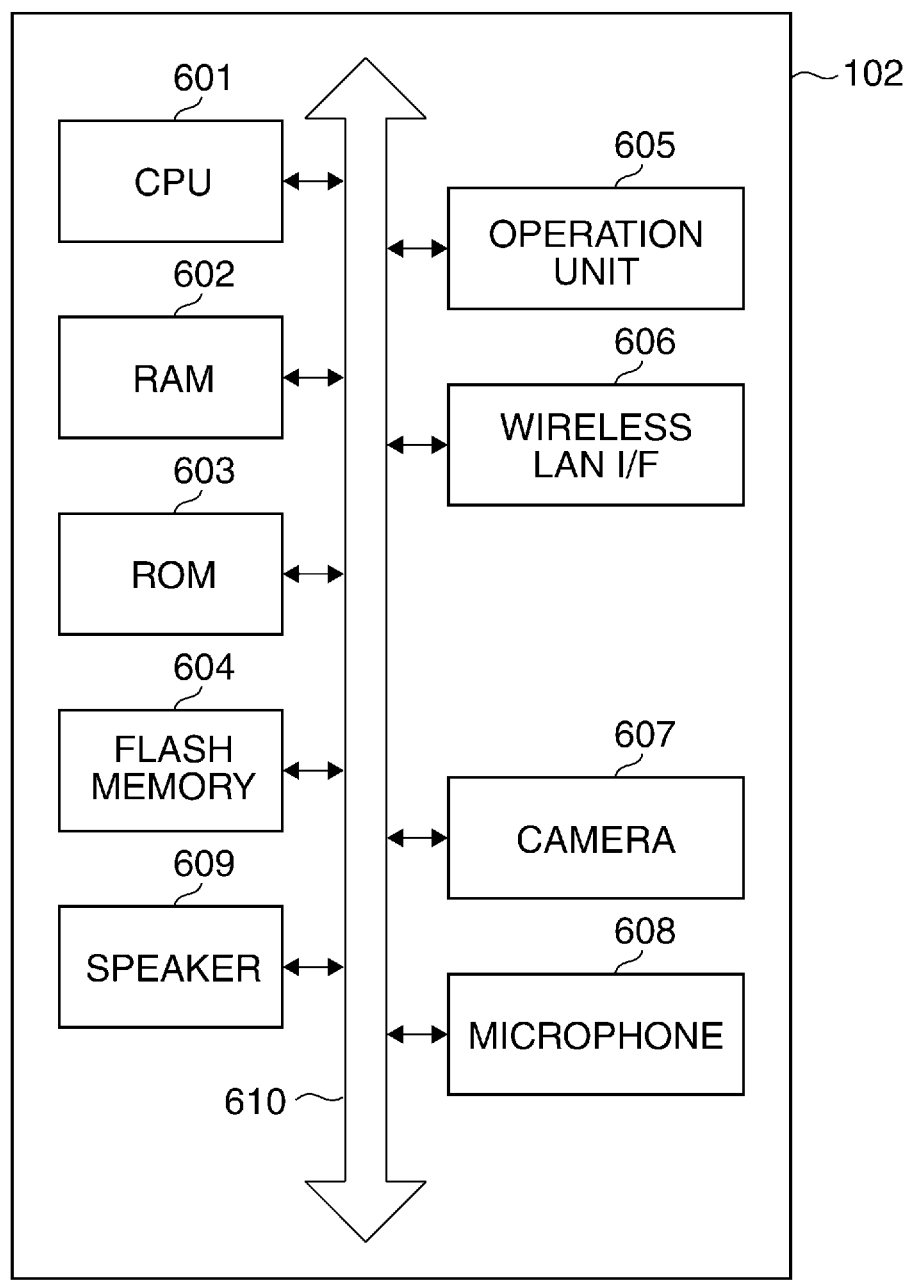
FIG. 6 is a block diagram schematically showing a hardware configuration of a portable terminal shown in FIG. 1.

FIG. 6 is a block diagram schematically showing a hardware configuration of the portable terminal 102 shown in FIG. 1.

As shown in FIG. 6, the portable terminal 102 is provided with a CPU 601, a RAM 602, a ROM 603, a flash memory 604, an operation unit 605, a wireless LAN I/F 606, a camera 607, a microphone 608, and a speaker 609. The CPU 601, RAM 602, ROM 603, flash memory 604, operation unit 605, wireless LAN I/F 606, camera 607, microphone 608, and speaker 609 are mutually connected through a system bus 610.

Figure 7:
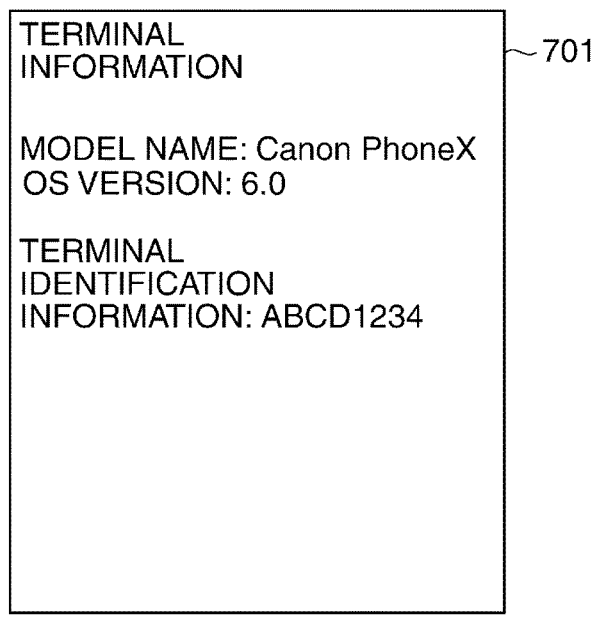
FIG. 7 is a view for describing terminal information about the portable terminal shown in FIG. 1.

The CPU 601 performs each process of a software module 800 shown in FIG. 8 mentions later by running a program stored in the ROM 603. The RAM 602 is used as a working area of the CPU 601, and the RAM 602 is used as a temporary storage area of data. The ROM 603 stores data and programs that are performed by the CPU 601. The flash memory 604 stores programs, setting information, etc. The operation unit 605 consists of a liquid crystal display unit that has a touch panel function and hard keys, which are not shown. The operation unit 605 receives information input by a user. Moreover, the operation unit 605 displays information. For example, the operation unit 605 displays a model name and OS version of the portable terminal 102, and terminal information 701 shown in FIG. 7 including identification information that identifies the portable terminal 102. The wireless LAN I/F 606 performs a wireless LAN communication with the MFP 101 etc. through the access point 103. For example, the wireless LAN I/F 606 sends the MFP 101 print data mentioned later through the access point 103. The camera 607 takes a video image and a still image. The microphone 608 receives voice input of the user at the time of a call. The speaker 609 outputs a voice received by another portable terminal of a call destination.

Figure 8:
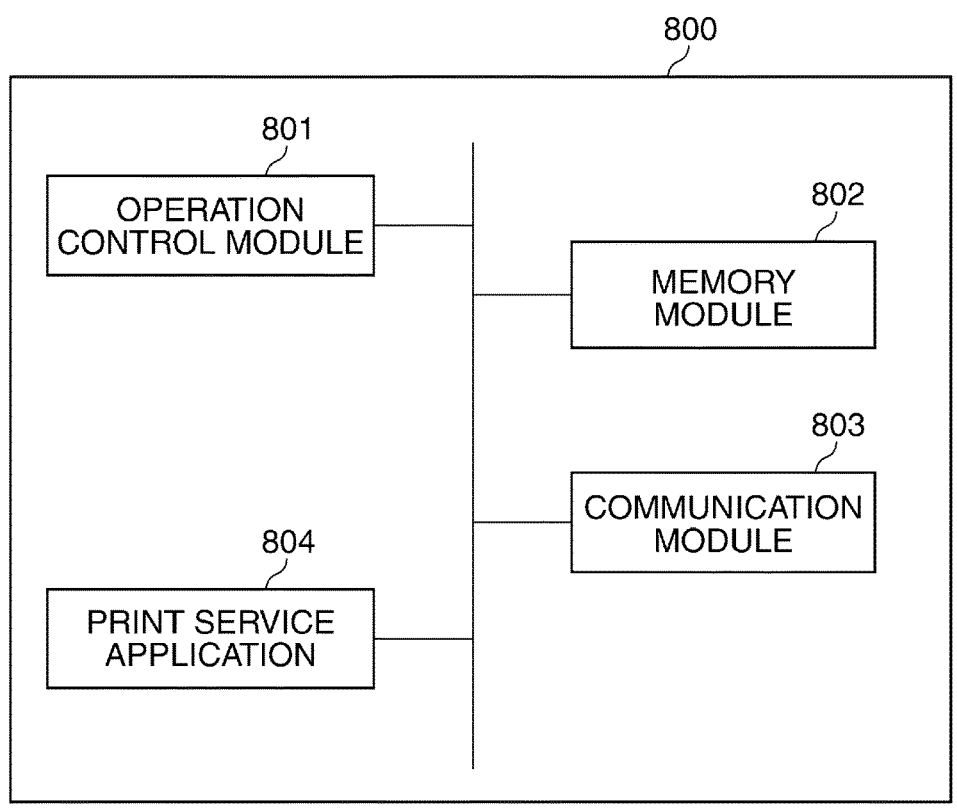
FIG. 8 is a block diagram schematically showing a configuration of a software module of the portable terminal shown in FIG. 1.

FIG. 8 is a block diagram schematically showing a configuration of a software module 800 of the portable terminal 102 shown in FIG. 1.

As shown in FIG. 8, the software module 800 is provided with an operation control module 801, a memory module 802, a communication module 803, and a print application module 804. Each process of the software module 800 is performed when the CPU 601 runs a program stored in the ROM 603.

The operation control module 801 controls the display on the operation unit 605. Moreover, the operation control module 801 receives information that was input by a user's operation to the operation unit 605. The memory module 802 makes the ROM 603 and the flash memory 604 store data. Moreover, the memory module 802 reads data stored in the ROM 603 and the flash memory 604. The communication module 803 controls a communication by the wireless LAN I/F 606. The print application module 804 sends the MFP 101 the print data in the protocol format that is acceptable to the printer unit 211 of the MFP 101.

Figure 9:
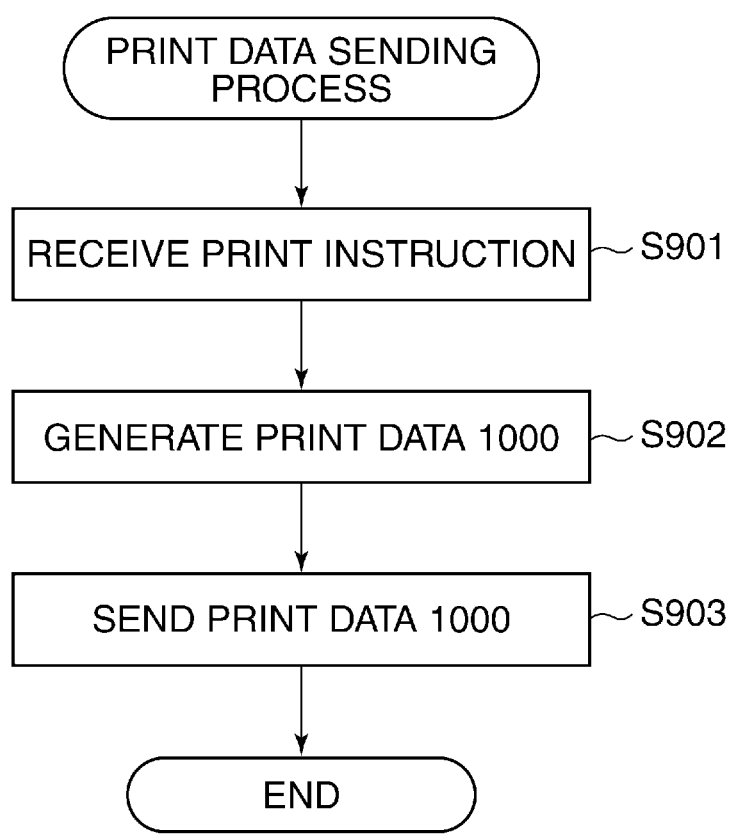
FIG. 9 is a flowchart showing a print data sending process executed by the portable terminal shown in FIG. 1.

FIG. 9 is a flowchart showing a print data sending process executed by the portable terminal 102 shown in FIG. 1.

The process in FIG. 9 is performed when the CPU 601 of the portable terminal 102 runs the program stored in the ROM 603.

Figure 10A:
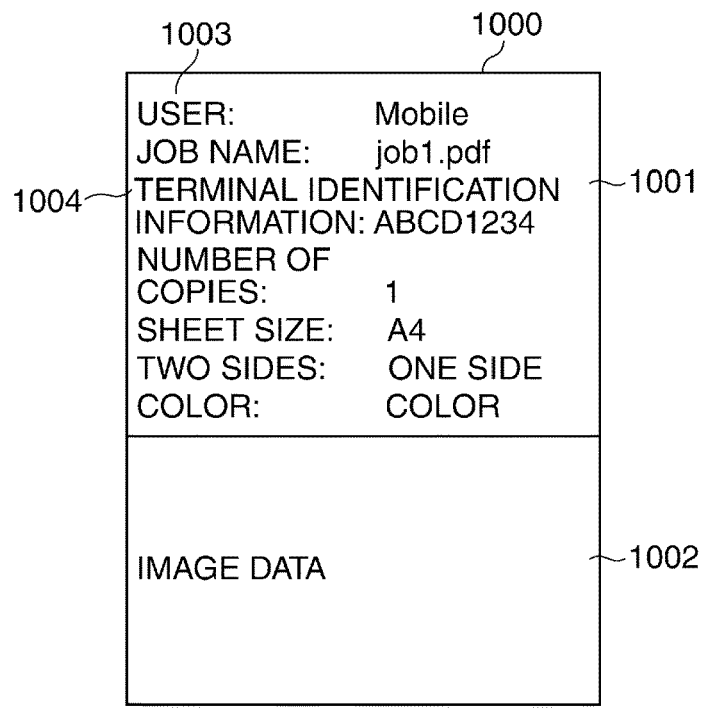
FIG. 10A and FIG. 10B are views showing examples of the print data received by the MFP shown in FIG. 1.

In FIG. 9, when receiving a print instruction from a user (step S901), the CPU 601 first generates the print data 1000 in FIG. 10A (step S902). The print data 1000 generated with the portable terminal 102 includes print setting information 1001 and image data 1002. The print setting information 1001 includes user information 1003 about the user who instructed printing and terminal identification information 1004 for specifying the portable terminal 102 that sent the print data. A character string that shows the type of the portable terminal 102, for example "Mobile", is set to the user information 1003, and a serial number of the portable terminal 102 that can identify the portable terminal 102 or a hash value of the serial number, etc. are set to the terminal identification information 1004. That is, the user who instructed printing cannot be specified from the user information 1003 of the print data 1000. Next, the CPU 601 sends the generated print data 1000 to the MFP101 (step S903), and finishes this process.

Figure 10B:
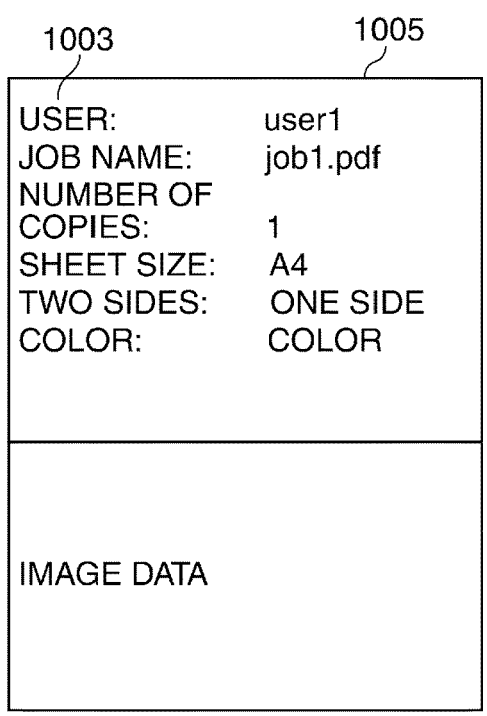

It should be noted that an information processing apparatus like a PC to which a user name for login is beforehand set up generates print data 1005 in which the user name for login is set to the user information 1003 as shown in FIG. 10B. The print data 1005 does not include the terminal identification information 1004.

Figure 11:
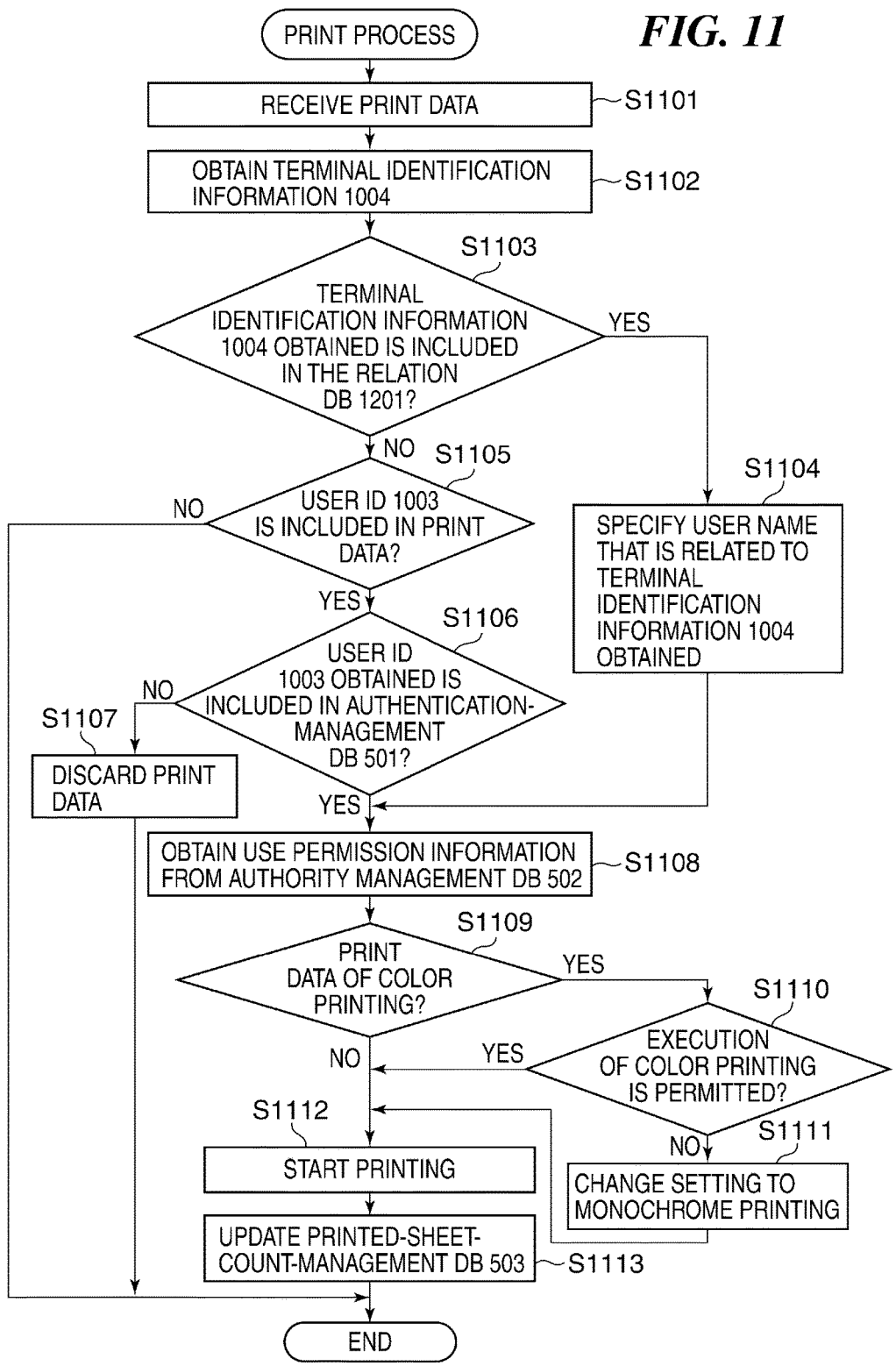
FIG. 11 is a flowchart showing a print process executed by the MFP shown in FIG. 1.

FIG. 11 is a flowchart showing a print process executed by the MFP 101 shown in FIG. 1.

The process in FIG. 11 is performed when the CPU 202 of the MFP 101 runs the program stored in the ROM 204 and the HDD 205.

For example, when the MFP 101 performs an update process of the printed-sheet-count-management DB 503 as a process corresponding to a user, the MFP101 tries to specify a user on the basis of the user information 1003 of the received print data 1000. When receiving the print data 1005 shown in FIG. 10B, the MFP 101 is able to specify the user who instructed printing from the user name for login set as the user information 1003. On the other hand, when the user name for login to the information processing apparatus like the portable terminal 102 is not set, the information processing apparatus cannot set up the information that specifies the user who instructed printing as the user information 1003 (see the print data 1000 in FIG. 10A, for example). In this case, the MFP 101 cannot specify the user who instructed printing from the information included in the user information 1003 only, and cannot update the printing sheet number of the performed printing in the printed-sheet-count-management DB 503. That is, a conventional MFP cannot perform a process corresponding to a user.

On the other hand, in the embodiment, a user who instructed printing to the portable terminal 102 with the print data 1000 is specified on the basis of a later-mentioned relation DB 1201 shown in FIG. 12 that relates the portable terminal 102 with the user who is permitted to use the MFP 101, and a process corresponding to the specified user is performed.

As shown in FIG. 11, the CPU 202 first receives print data (step S1101), and obtains the terminal identification information 1004 from the print data received (step S1102). Next, the CPU 202 determines whether the terminal identification information 1004 obtained in the step S1102 is included in the relation DB 1201 in FIG. 12 that is stored in the HDD 205 (step S1103). The relation DB 1201 is the database that relates the terminal identification information, such as the serial number of the portable terminal 102 or a hash value of the serial number, with the user name managed by the authentication management DB 501.

In the embodiment, the CPU 202 displays a setting screen 1300 in FIG. 13A including contents of the relation DB 1201 and an addition button 1301 on the operation-display unit 213 in response to a user's instruction. When the user presses the addition button 1301, the CPU 202 displays a setting screen 1302 in FIG. 13B for relating the portable terminal 102 to the user on the operation-display unit 213. The setting screen 1302 is provided with setting fields 1303 and 1304. The terminal identification information of the portable terminal 102 is set to the setting field 1303, and the user name managed by the authentication-management DB 501 is displayed in the setting field 1304 so as to be selectable. The user is able to relate a new portable terminal with the user name by setting contents in the setting fields 1303 and 1304. The relation DB 1201 updated on the basis of the settings in the setting fields 1303 and 1304 is held in the HDD 205.

As a result of the determination in the step S1103, when the terminal identification information 1004 obtained is included in the relation DB 1201, the CPU 202 specifies the user name that is related to the terminal identification information 1004 on the basis of the relation DB 1201 (step S1104). Next, the CPU 202 performs a process in step S1108 mentioned later.

As a result of the determination in the step S1103, when the terminal identification information 1004 obtained is not included in the relation DB 1201, the CPU 202 determines whether the user information 1003 is included in the print data received (step S1105).

As a result of the determination in the step S1105, when the user information 1003 is not included in the print data received, the CPU 202 finishes this process. On the other hand, as a result of the determination in the step S1105, when the user information 1003 is included in the print data received, the CPU 202 obtains the user information 1003 from the print data concerned, and determines whether the user information 1003 obtained is included in the authentication-management DB 501 (step S1106).

As a result of the determination in the step S1106, when the user information 1003 obtained is not included in the authentication-management DB 501, the CPU 202 discards the print data obtained (step S1107), and finishes this process. On the other hand, as a result of the determination in the step S1106, when the user information 1003 obtained is included in the authentication-management DB 501, the CPU 202 obtains use permission information corresponding to the user ID 1003 concerned from the authority management DB 502 (step S1108). Next, the CPU 202 determines whether the print data received is print data of color printing (step S1109).

As a result of the determination in the step S1109, when the print data received is print data of color printing, the CPU 202 determines whether execution of color printing is permitted on the basis of the use permission information obtained in the step S1108 (step S1110).

As a result of the determination in the step S1110, when execution of color printing is not permitted, the CPU 202 changes the setting of color printing that was set on the basis of the print data to the setting of monochrome printing (step S1111), and starts printing (step S1112). Next, the CPU 202 counts the printing sheet number as the process corresponding to the user, and updates the printed-sheet-count-management DB 503 in step S1113 (the process execution unit). Specifically, the CPU 202 adds the printing sheet number counted to the monochrome printing sheet number corresponding to the specified user name in the printed-sheet-count-management DB 503. Then, the CPU 301 finishes this process.

When the print data received is not print data of color printing as a result of the determination in the step S1109, or when the execution of color printing is permitted as a result of the determination in the step S1110, the CPU 202 performs the process in and after the step S1112 according to the setting of the print data.

Figure 12:
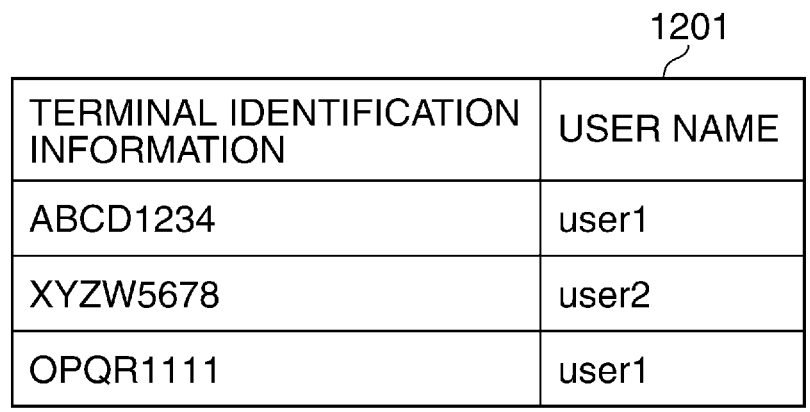
FIG. 12 is a view showing an example of a relation DB managed by the MFP shown in FIG. 1.

According to the above-mentioned process in FIG. 11, the user who instructed printing to the portable terminal 102 is specified on the basis of the relation DB 1201 shown in FIG. 12 that relates the portable terminal 102 with the user who is permitted to use the MFP 101, and a process corresponding to the specified user is performed. Accordingly, even if the information that specifies the user who instructed printing from the portable terminal 102 is not sent, the process corresponding to the user is performed certainly.

Moreover, the MFP 101 mentioned above holds the relation DB 1201. Accordingly, it is unnecessary to perform the process to relate the portable terminal 102 with a user every time when a process corresponding to a user is performed. As a result, time and effort of the relating process does not increase more than needed.

Furthermore, since the contents of the relation DB 1201 are displayed on the operation-display unit 213 in the above-mentioned process in FIG. 11, the user is able to grasp the contents of the relation DB 1201 easily.

The above-mentioned relation DB 1201 relates the terminal identification information of the portable terminal 102 included in the print data with the user name of the user who is permitted to use the MFP 101. Accordingly, the portable terminal 102 is related to the user who is permitted to use the MFP 101.

Although the update process of the printed-sheet-count-management DB 503 was described in the above-mentioned embodiment as an example of a process corresponding to a user, a process corresponding to a user is not limited to the update process of the printed-sheet-count-management DB 503. For example, a process corresponding to a user may be a retention printing process.

Figure 14:
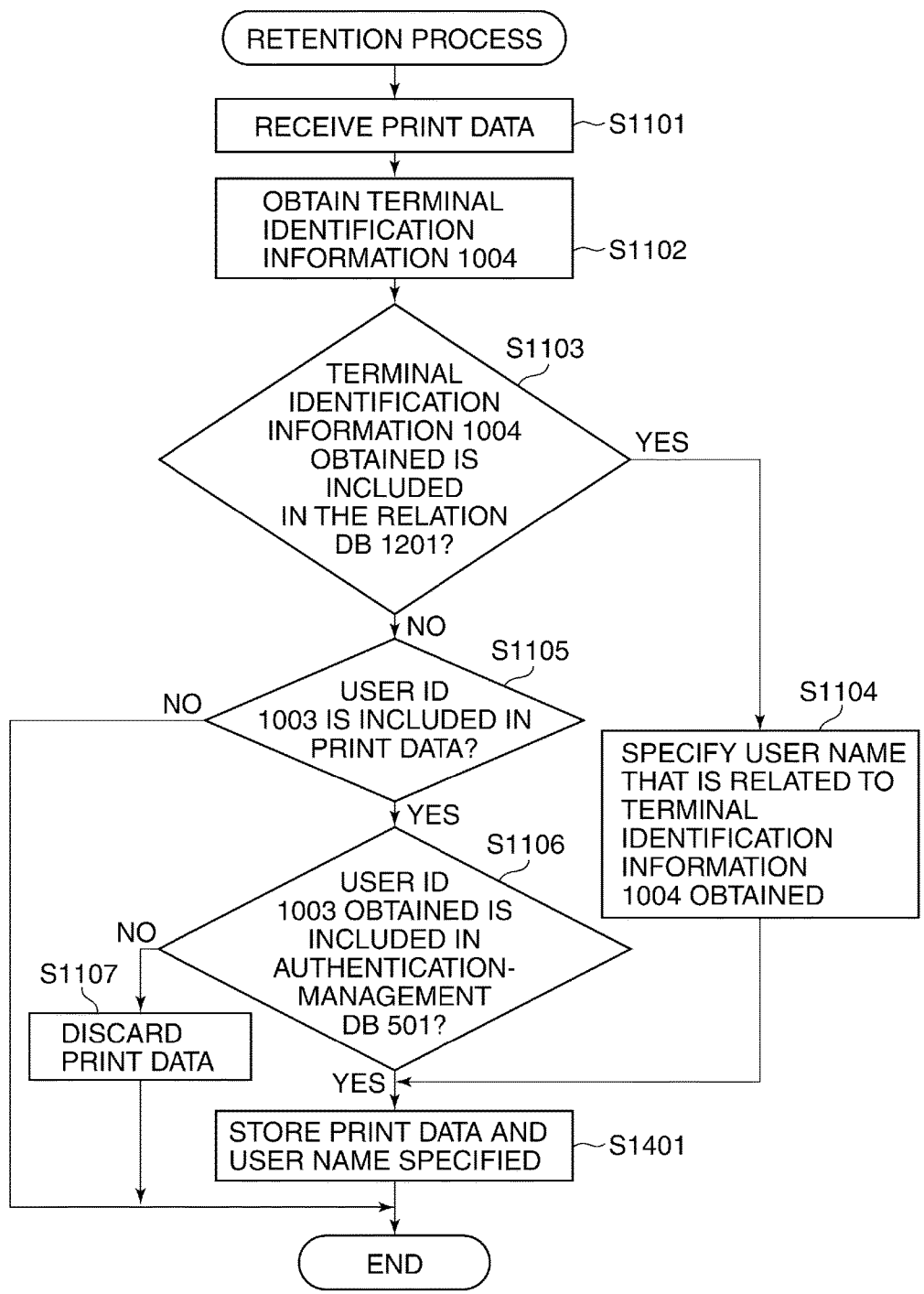
FIG. 14 is a flowchart showing a retention process executed by the MFP in FIG. 1.

FIG. 14 is a flowchart showing a retention process executed by the MFP 101 in FIG. 1.

The process in FIG. 14 is performed when the CPU 202 of the MFP101 runs the program stored in the ROM 204 or the HDD 205, and is premised on the case where a user sends the MFP 101 print data of retention printing from the portable terminal 102 etc. In the retention printing, even if the MFP 101 receives the print data of the retention printing from the portable terminal 102 etc., the MFP101 does not print the print data concerned immediately, but prints the print data retained in response to a user's print start instruction from the MFP101.

As shown in FIG. 14, the CPU 202 first performs the process in the steps S1101 through S1106 in FIG. 11.

As a result of the determination in the step S1106, when the user information 1003 obtained is not included in the authentication-management DB 501, the CPU 202 discards the print data obtained (step S1107), and finishes this process. On the other hand, as a result of the determination in the step S1106, when the user information 1003 obtained is included in the authentication-management DB 501, the CPU 202 stores the print data received and the user name specified into the HDD 205 (step S1401), and finishes this process.

Figure 15:
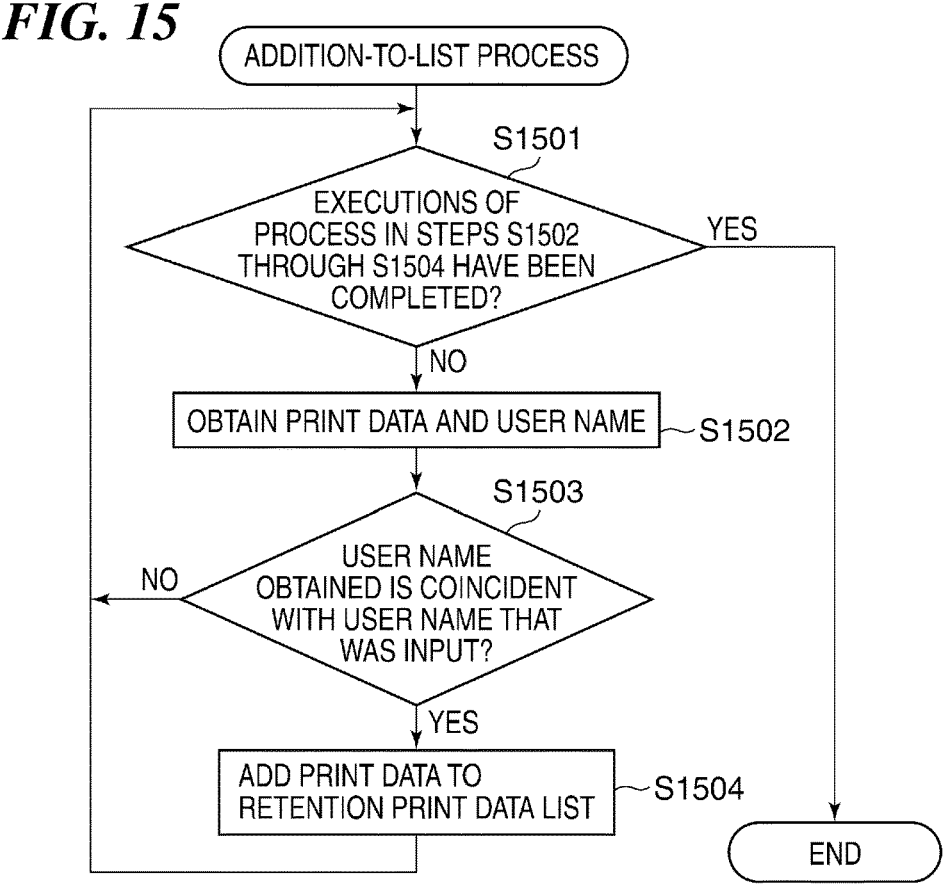
FIG. 15 is a flowchart showing an addition-to-list process executed by the MFP in FIG. 1.

FIG. 15 is a flowchart showing an addition-to-list process executed by the MFP 101 in FIG. 1.

The process in FIG. 15 is performed when the CPU 202 of the MFP 101 runs the program stored in the ROM 204 and the HDD 205. Moreover, the process in FIG. 15 is premised on the case where the user logs in to the MFP 101 by operating the login information setting screen 300 after the execution of the process in FIG. 14 is completed.

As shown in FIG. 15, the CPU 202 first determines whether the executions of the process in the steps S1502 through S1504 mentioned later have been completed for all pieces of the print data stored in the HDD 205 (step S1501).

As a result of the determination in the step S1501, when the executions of the process in the steps S1502 through S1504 mentioned later have been completed for all pieces of the print data stored in the HDD 205, the CPU 202 finishes this process.

As a result of the determination in the step S1501, when the executions of the process in the steps S1502 through S1504 mentioned later have not been completed for any pieces of the print data stored in the HDD 205, the CPU 202 extracts one piece of the print data from among the pieces of the print data that do not complete executions of the process concerned. After that, the CPU 202 obtains the one piece of the print data concerned and the user name that is stored in the HDD 205 together with the one piece of the print data (step S1502). Next, the CPU 202 determines whether the user name obtained is coincident with the user name that was input to the login information setting screen 300 (step S1503).

As a result of the determination in the step S1503, when the user name obtained is not coincident with the user name that was input to the login information setting screen 300, the CPU 202 returns the process to the step S1501.

Figure 16:
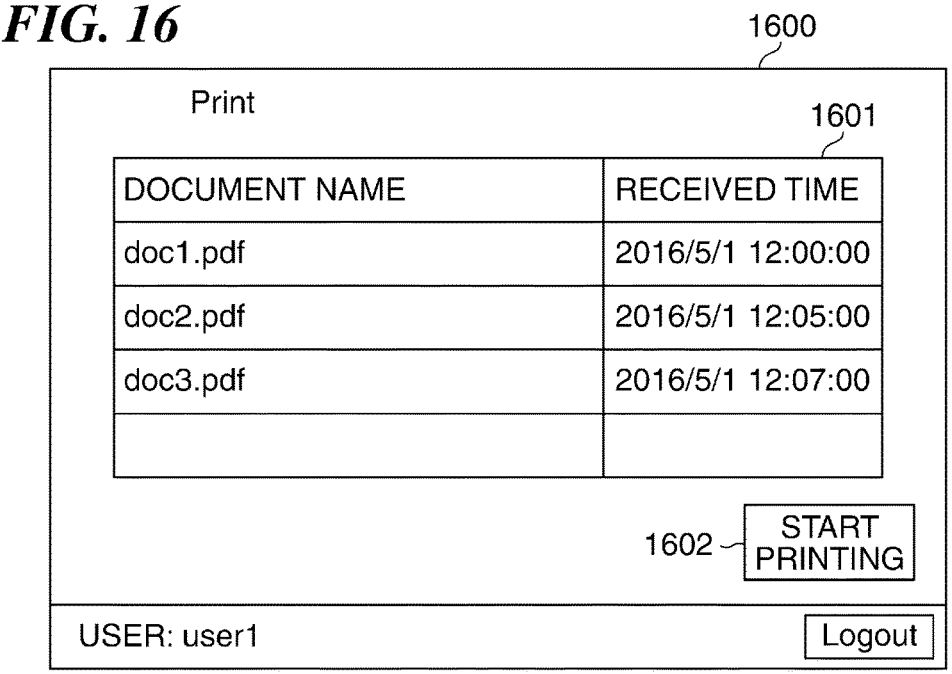
FIG. 16 is a view showing an example of the setting screen displayed on the operation-display unit shown in FIG. 2.

As a result of the determination in the step S1503, when the user name obtained is coincident with the user name that was input to the login information setting screen 300, the CPU 202 adds the print data obtained in the step S1502 to a retention print data list for displaying list information about the print data about the retention printing corresponding to the user name concerned (step S1504). When the user who is logging in to the MFP 101 instructs the MFP 101 to display the list information about the print data of the retention printing, the CPU 202 displays a setting screen 1600 in FIG. 16 on the operation-display unit 213 on the basis of the retention print data list. The setting screen 1600 includes list information 1601 and a printing start button 1602. Only the pieces of the print data of the retention printing corresponding to the user name specified among a plurality of pieces of the print data stored in the HDD 205 are displayed as the list information 1601. The printing start button 1602 is a button that instructs to start printing of the print data. When at least one piece of the print data is selected among the pieces of the print data displayed as the list information 1601 and the printing start button 1602 is pressed, the MFP 101 starts a retention printing process in FIG. 17 mentioned later to print the print data selected. Then, the CPU 202 returns the process to the step S1501.

Figure 17:
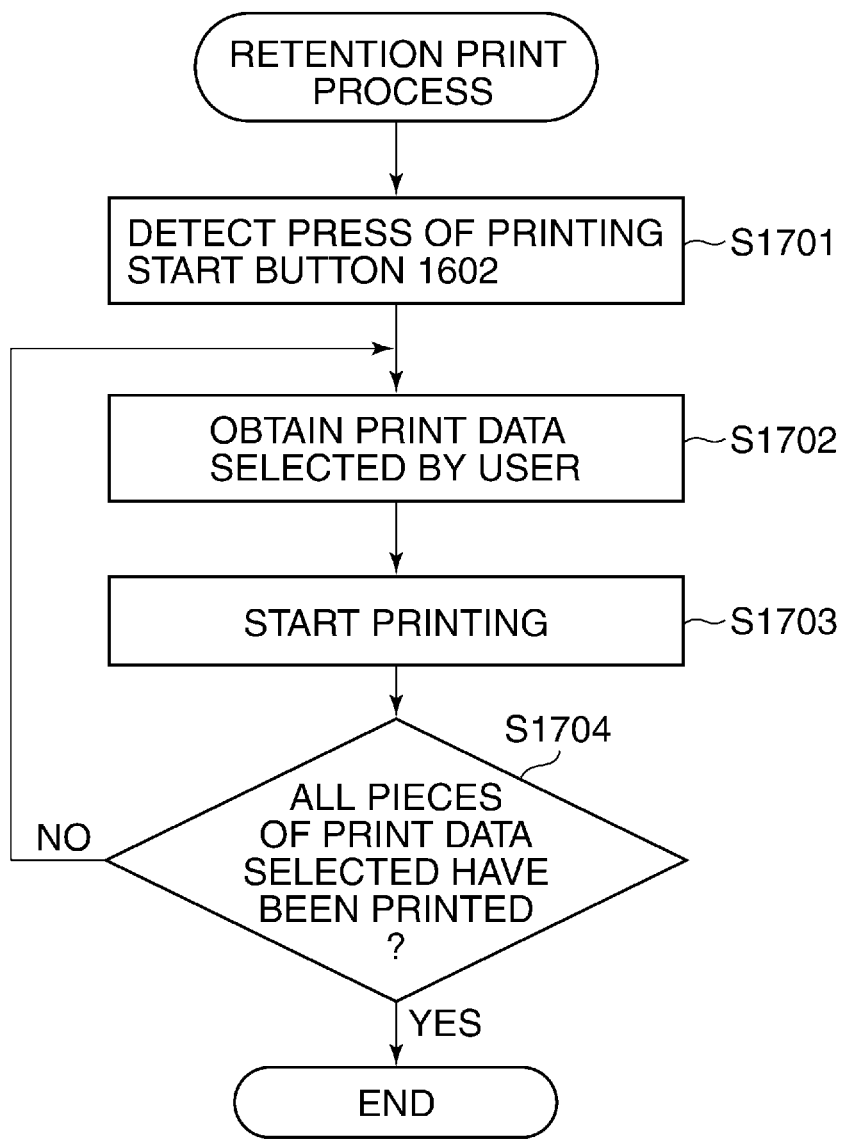
FIG. 17 is a flowchart showing a retention printing process executed by the MFP in FIG. 1.

FIG. 17 is a flowchart showing the retention printing process executed by the MFP 101 in FIG. 1.

The process in FIG. 17 is performed when the CPU 202 of the MFP 101 runs the program stored in the ROM 204 and the HDD 205.

As shown in FIG. 17, when detecting a press of the printing start button 1602 by the user (step S1701), the CPU 202 obtains the print data that the user selected in the list information 1601 from the HDD 205 (step S1702). Next, the CPU 202 starts printing on the basis of the print data obtained (step S1703), and determines whether all pieces of the print data selected have been printed (step S1704).

As a result of the determination in the step S1704, when at least one piece of the print data selected has not been printed, the CPU 202 returns the process to the step S1702. On the other hand, as a result of the determination in the step S1704, when all pieces of the print data selected have been printed, the CPU 202 finishes this process.

According to the above-mentioned processes in FIG. 14, FIG. 15, and FIG. 17, the same effect of the above-mentioned process in FIG. 11 is produced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-148522, filed Jul. 28, 2016, which is hereby incorporated by reference herein in its entirety.

What is claimed is:

1. An apparatus for processing print data, the apparatus comprising:
   one or more memories that store computer readable instructions;
   a database stored in the one or more memories and including relating information that relates terminal identification information with a user name;
   an interface that receives print data; and
   a processor that executes the computer readable instructions to:
   receive print data from a terminal via the interface, wherein the received print data includes terminal identification information specifying the terminal that sent the print data;
   obtain the terminal identification information specifying the terminal that sent the print data from the received print data;
   specify, based on the relating information included in the database stored in the one or more memories, a user name related with the obtained terminal identification information that is included in the received print data and that specifies the terminal that sent the print data; and
   execute a process corresponding to the specified user name for the received print data.

2. The apparatus according to claim 1, wherein the process corresponding to the specified user name is a process for counting a number of sheets printed by the received print data for the specified user name.

3. The apparatus according to claim 1, wherein the process corresponding to the specified user name is a process for determining whether execution of color printing for the received print data is permitted to the specified user name.

4. The apparatus according to claim 1, wherein the process corresponding to the specified user name is a process for a retention printing that retains the received print data, and
   wherein, in the process for the retention printing, a list of the retained print data corresponding to a user who logs-in a printer is displayed, and the retained print data is printed in response to a user's print start instruction on the printer.

5. The apparatus according to claim 1, wherein the user name is user identification information that specifies a user who is permitted to use a printer.

6. The apparatus according to claim 1, wherein the processor executes the computer readable instructions to:
   determine whether the database includes a user name related to the terminal identification information included in the received print data; and
   execute a process corresponding to user information included in the received print data in a case where it is determined that the database does not include the user name related to the terminal identification information included in the received print data.

7. The apparatus according to claim 1, wherein the processor executes the computer readable instructions to receive the print data from the terminal via the interface, wherein the received print data includes the terminal identification information specifying the terminal that sent the print data but does not include the user name related with the obtained terminal identification information according to the relating information included in the database stored in the one or more memories.

8. A method for processing print data, the method comprising:
   storing, in a database stored in a memory, relating information that relates terminal identification information with a user name;
   receiving print data from a terminal, wherein the received print data includes terminal identification information specifying the terminal that sent the print data;
   obtaining the terminal identification information specifying the terminal that sent the print data from the received print data;
   specifying, based on the relating information stored in the database stored in the memory, a user name related with the obtained terminal identification information that is included in the received print data and that specifies the terminal that sent the print data; and
   executing a process corresponding to the specified user name for the received print data.

9. The method according to claim 8, wherein the process corresponding to the specified user name is a process for counting a number of sheets printed by the received print data for the specified user name.

10. The method according to claim 8, wherein the process corresponding to the specified user name is a process for determining whether execution of color printing for the received print data is permitted to the specified user name.

11. The method according to claim 8, wherein the process corresponding to the specified user name is a process for a retention printing that retains the received print data, and
    wherein, in the process for the retention printing, a list of the retained print data corresponding to a user who logs-in a printer is displayed, and the retained print data is printed in response to a user's print start instruction on the printer.

12. The method according to claim 8, wherein the user name is user identification information that specifies a user who is permitted to use a printer.

13. The method according to claim 8, further comprising:
    determining whether the database stores a user name related to the terminal identification information included in the received print data; and
    executing a process corresponding to user information included in the received print data in a case where it is determined that the database does not store the user name related to the terminal identification information included in the received print data.

14. A non-transitory computer-readable storage medium storing a computer program, wherein at least one processor executes the stored computer program to perform:
    storing, in a database stored in a memory, relating information that relates terminal identification information with a user name;
    receiving print data from a terminal, wherein the received print data includes terminal identification information specifying the terminal that sent the print data;
    obtaining the terminal identification information specifying the terminal that sent the print data from the received print data;
    specifying, based on the relating information stored in the database stored in the memory, a user name related with the obtained terminal identification information that is included in the received print data and that specifies the terminal that sent the print data; and
    executing a process corresponding to the specified user name for the received print data.

15. The non-transitory computer-readable storage medium according to claim 14, wherein the process corresponding to the specified user name is a process for counting a number of sheets printed by the received print data for the specified user name.

16. The non-transitory computer-readable storage medium according to claim 14, wherein the process corresponding to the specified user name is a process for determining whether execution of color printing for the received print data is permitted to the specified user name.

17. The non-transitory computer-readable storage medium according to claim 14, wherein the process corresponding to the specified user name is a process for a retention printing that retains the received print data, and
   wherein, in the process for the retention printing, a list of the retained print data corresponding to a user who logs-in a printer is displayed, and the retained print data is printed in response to a user's print start instruction on the printer.

18. The non-transitory computer-readable storage medium according to claim 14, wherein the user name is user identification information that specifies a user who is permitted to use a printer.

19. The non-transitory computer-readable storage medium according to claim 14, wherein the at least one processor executes the stored computer program to further perform:

determining whether the database stores a user name being related to the terminal identification information included in the received print data; and
   executing a process corresponding to user information included in the received print data in a case where it is determined that the database does not include the user name related to the terminal identification information included in the received print data.

20. A system for processing print data, the system comprising:
   a storage that stores a database including relating information that relates terminal identification information with a user name; and
   at least one processor that executes computer readable instructions to:
   obtain, from print data sent by a terminal, terminal identification information specifying the terminal that sent the print data;
   specify, based on the relating information included in the database stored in the storage, a user name related with the obtained terminal identification information that is included in the sent print data and that specifies the terminal that sent the print data; and
   execute a process corresponding to the specified user name for the print data.

* * * * *